United States Patent Office 2,963,517
Patented Dec. 6, 1960

2,963,517

SEPARATION AND PURIFICATION OF HYDROCARBONS

Raymond C. Scofield, Bartlesville, Okla., assignor to Phillips Petroleum Company, a corporation of Delaware No Drawing. Filed Nov. 17, 1958, Ser. No. 774,162

3 Claims. (Cl. 260—666)

This invention relates to separation and purification of hydrocarbons. In a more particular aspect the invention relates to a method for removing cyclopentene and $C_5$ diolefins from a liquid $C_5$ hydrocarbon fraction by complex formation, followed by separation of the diolefins from the cyclopentene by another complex-forming step.

As is well known, cyclopentene and diolefins containing 5 carbon atoms often occur together in liquid $C_5$ hydrocarbon streams. It is desirable to recover from such streams such diolefins and cyclopentene, each of which have important chemical uses. Separation of these compounds from a liquid $C_5$ hydrocarbon fraction is quite difficult and expensive because of the close boiling points of the compounds involved. Moreover, separation of cyclopentene and certain of the diolefins is extremely difficult to accomplish by fractional distillation, and is in fact, virtually impossible in the case of separation of cyclopentene and cis-piperylene, each of which have approximately the same boiling point at 111° F.

It is therefore an object of my invention to provide a method for separation of $C_5$ diolefins and cyclopentene from a liquid $C_5$ hydrocarbon fraction containing the same and also containing other $C_5$ hydrocarbons, and to further separate the diolefins from the cyclopentene.

Other objects, as well as aspects and advantages, of the invention will become apparent from the accompanying disclosure.

According to my invention there is provided a process which comprises contacting a liquid hydrocarbon $C_5$ fraction containing diolefins, such as piperylene, isoprene, 3-methyl-1,2-butadiene, 1,2-pentadiene, 2,3-pentadiene and 1,4-pentadiene, containing cyclopentene with an aqueous slurry of cuprous chloride containing 1-5 weight percent ammonium chloride at a temperature of 40° F. or below, usually 30 to 40° F., to form a solid complex between the cuprous chloride and the diolefins and between the cuprous chloride and the cyclopentene, separating the unreacted hydrocarbons from the mixture, usually by evaporation, decomposing the complex and recovering the $C_5$ diolefins and cyclopentene in admixture, contacting the latter mixture with an aqueous cuprous chloride slurry containing 15-25 weight percent ammonium chloride at a temperature in the range from 65 to 90° F. and thus forming a solid complex between the cuprous chloride and the diolefins, but not the cyclopentene, evaporating the cyclopentene from the mixture and recovering same, and then decomposing the latter complex and separating the resulting diolefins, thus effecting separation of the cyclopentene from the diolefins and recovering each of the streams in greatly increased purity.

My invention is based upon my discovery that, while both $C_5$ diolefins and cyclopentene will form a solid complex with an aqueous cuprous chloride containing 1-5 weight percent ammonium chloride at temperatures below 40° F., a $C_5$ diolefin, but not the cyclopentene, will form a solid cuprous chloride complex when contacted with an aqueous cuprous chloride slurry containing 15–25 weight percent ammonium chloride at 65–90° F.

The invention is, of course, quite important for the separation of cyclopentene from piperylene, since these compounds have substantially the same boiling point, and also because cyclopentene is a fairly rare chemical of high market value.

As is well known, the solid part of the cuprous chloride slurries is the cuprous chloride, which is only very slightly soluble in water. The ammonium chloride component of the reagent is dissolved in the water.

Although the mixture treated is described as a $C_5$ liquid hydrocarbon fraction, said mixture can also contain hydrocarbons of higher or lower molecular weight.

EXAMPLE I 890 milliliters of a crude piperylene fraction having the compositions shown in the first column of Table I was contacted with a slurry containing 2700 grams of cuprous chloride, 1350 grams of ammonium chloride, 100 ml. of HCl and 4075 ml. of water and was reacted therewith with stirring for a period of 10 minutes at a temperature in the range of 70 to 80° F. The amount of cuprous chloride reagent employed was a deficiency, that is, not enough was employed to complex all of the piperylene. After the reaction the unreacted hydrocarbons were removed by applying 25 mm. Hg vacuum. The hydrocarbons so recovered are shown as cut 1 in Table I. This cut amounted to 209 ml. Then the complex was decomposed by the application of heat and the hydrocarbon so recovered was evaporated from the mixture, condensed, and was analyzed and found to contain 99.7+ weight percent piperylenes. This is cut 2 shown in Table I and amounted to 507 ml. The following compositions are in terms of percent by weight.

*Table I*

|  | Charge | Cut 1 (Unreacted) | Cut 2 |
|---|---|---|---|
| 2-Methyl-2 butene | 0.47 | 1.26 |  |
| Cyclopentene | 11.92 | 42.23 |  |
| Trans-piperylene | 75.43 | 39.62 |  |
| Cis-piperylene | 11.06 | 16.89 | 99.7 |
| Others | 1.12 |  |  |

EXAMPLE II

A liquid $C_5$ cut of the following composition, percent by weight

| | |
|---|---|
| Trans-piperylene | 70.1 |
| Cis-piperylene | 13.8 |
| Cyclopentene | 12.0 |
| 2-methyl-2-butene | 2.8 |
| Others | 1.3 |
| | 100.0 | is contacted with agitation with an excess of a cuprous chloride slurry containing 30 weight percent CuCl, 3 weight percent $NH_4Cl$ and the balance water, at a temperature of 34° F. for a period of ten minutes. At the end of this time the unreacted materials are removed by vacuum evaporation at a temperature kept below 38° F. The remaining mixture is then heated to decompose the complexes and obtain a hydrocarbon mixture having 12.1 weight percent cyclopentene. This mixture is then contacted with an excess of an aqueous cuprous chloride slurry containing 30 parts by weight CuCl, 15 parts by weight $NH_4Cl$, 0.5 part by weight HCl and 54.5 parts by weight water, for a period of ten minutes at a temperature of 75° F. The piperylenes form a solid complex with the cuprous chloride while the cyclopentene does not. The cyclopentene is evaporated from the mixture by pressure reduction while heating the mixture to maintain the temperature in the range from 70 to 75° F. The cyclopentene, recovered by condensation, has a purity of over 90 percent. The remaining slurry is heated to decompose the complex and the evaporated piperylenes so formed are condensed and found to have a purity of over 99.7 weight percent.

As will be evident to those skilled in the art, various modifications of this invention can be made or followed in the light of the foregoing disclosure and discussion without departing from the spirit and scope of the disclosure or from the scope of the claims.

I claim:

1. A method for recovery of $C_5$ diolefins and cyclopentene from a liquid $C_5$ hydrocarbon fraction containing same and also containing other hydrocarbons which comprises the steps of contacting said fraction with an aqueous cuprous chloride slurry containing 1-5 weight percent ammonium chloride at a temperature of 40° F. or below, thereby forming a solid complex between cuprous chloride and said diolefins and a solid complex between cuprous chloride and said cyclopentene, separating unreacted hydrocarbons, decomposing the complexes and thus recovering the $C_5$ diolefins and cyclopentene in admixture, contacting the latter admixture with an aqueous cuprous chloride slurry containing 15-25 weight percent ammonium chloride at a temperature from 65 to 90° F. and thus forming a solid complex between the cuprous chloride and diolefins but not the cyclopentene, separating said cyclopentene from the mixture and recovering same, decomposing the last-named complex, and separating the resulting diolefins and recovering same.

2. A method of claim 1 where the first-mentioned contacting is effected at a temperature in the range from 30 to 40° F.

3. A method of claim 1 where said diolefins comprise piperylene.

References Cited in the file of this patent

UNITED STATES PATENTS

| | | |
|---|---|---|
| 2,386,333 | Morris | Oct. 9, 1945 |
| 2,386,334 | Morris | Oct. 9, 1945 |